3,444,613
METHOD OF JOINING CARBIDE TO STEEL
Charles V. Foerster, Little Ferry, N.J., assignor to Coast Metals, Inc., Little Ferry, N.J., a corporation of Delaware
No Drawing. Filed Nov. 24, 1965, Ser. No. 509,599
Int. Cl. B23k 31/02; B22f 7/00
U.S. Cl. 29—473.1                                                6 Claims

ABSTRACT OF THE DISCLOSURE

A method is provided for bonding a carbide element to a support member, in which a preformed compact consisting of a mixture of nickel powder and an alloy powder of the group consisting of copper-manganese and copper-manganese-nickel alloys is interposed between the element and the support member, and the assembly heated to a temperature below the melting point of the nickel powder to cause the compact to bond the element to the support member. A preformed and sintered compact consisting of such powders is also provided.

---

This invention relates, as indicated, to a method of joining carbide tips, inserts and the like to shanks, dies, and the like, and to preformed joining materials therefor.

It has heretofore been proposed, as in the Whitney Patent No. 2,741,932, to manufacture crankshafts by assembling main bearing parts and crank pins, made of an allow steel, interposing between the parts a thin flat disc, wafer or washer (made by briquetting a powder of metallic joining material, sintering and then repressing to a high density), and then heating the assembly to cause the disc, wafer or washer to bond the parts together. In some cases, pressure is applied to the joining element during the heating, and induction heating is used. The combination of heat and pressure causes the connector element to become densified to a low residual porosity and at the same time to become permanently bonded to the steel elements.

In the same manner, carbide tipped tools, dies and wear-resistant inserts have been fabricated by using preforms or compacts of joint size between tips or shapes of cemented carbide and the steel shank which supports the tip or shape.

In one method, the preform or compact of a powdered metal is placed between the carbide tip or shape and the shank in a press, and the assembly heated until a joint is effected, and then quenched in oil. Preforms or compacts for this purpose have been made by pressing and sintering invar powder to a density of 80%, and the assemblies tested by shear rupture tests under loads of 500 p.s.i. for acceptability. Field failures were found to be as high as 50%, due to cracking of the carbide tips or shapes.

I have found that by using a preform or compact made from a mixture consisting of nickel powder and a brazing powder of a copper-manganese-nickel alloy, in equal amounts, and utilizing such preforms or compacts to bond the carbide tips to the steel shank, that the assemblies made in this manner could be subjected to shear rupture tests under loads of up to about 10,000 p.s.i., before failure occurred.

The copper-manganese-nickel alloy used in the aforesaid mixture was Coast Metals 1700N, consisting of 67.5% copper, 23.5% manganese and 9.0% nickel, having a melting point of about 1700° F.

The preforms used in these tests were made by pressing the nickel powder and copper-manganese-nickel alloy powder mixture and sintering them in dry hydrogen to provide discs of ½″ diameter and 1/32″ thickness.

These discs were then used in joining a cobalt-bonded tungsten carbide tip containing 15% cobalt, to a steel shank made of S.A.E. 3445, having the following nominal composition or analysis:

|  | Percent |
|---|---|
| Carbon | .35–.44 |
| Manganese | .3–.6 |
| Nickel | 3.0 |
| Chromium | .6–.9 |
| Molybdenum | .2–.3 |

The carbide tip, preform, and shank were cleaned in acetone and fluxed with a high temperature brazing flux, and the assembled parts induction brazed at approximately 1940° F. The assemblies were then heat treated by annealing and quench hardening at 1475° F. in oil, then tempering at 390° F. for 1½ hours, and cooling in air.

The brazing wafer or compact, in each case, was approximately ⅛″ larger in diameter than the diameter of the shank and carbide tip.

The brazing alloy (Coast Metals 1700N) bleeds from the wafer and brazes onto the surfaces of the carbide tip and steel shank, so that the resulting structure consists of the carbide tip, the shank, and a joining element approximately 1/64″ in thickness, of nickel, from which the 1700N alloy has bled to produce the bonding or brazing. The carbide and shank leave a structure chiefly of nickel with regulated porosity to absorb stresses formed on cooling, due to the differences in linear expansion of the martensitic die steel shank and the carbide tip.

The increase in transverse strength is due, in part, to brazing with a preform slightly larger in diameter than the diameter of the carbide tip and steel shank, which probably diminishes the "notch effect" due to shrinkage of the preform on brazing.

Instead of using a preform made in the manner hereinbefore described, the mixture of nickel powder and copper-manganese-nickel alloy powder may be placed, to a predetermined depth, i.e., .040″ to .050″, in a flat refractory boat and heated in a dry hydrogen atmosphere to a sintering temperature (about 1500° F.). This produces a somewhat fragile sinter, which is then cold rolled to the desired thickness, the density being controlled by the degree of reduction of the sinter. A strip, about 9 inches long, 2 inches wide, and .030″ thick, was produced in this manner. This was then trimmed and cut by shearing on a trimming board to provide 2″ x 4″ samples. Circular discs or wafers, similar to those previously described, were punched from these samples, in order to provide specimens for rupture tests to compare with those made previously from the compacted preforms.

Although the invention has been described particularly with reference to the use of a copper-manganese-nickel alloy powder, in the mixture which is used for the preform, any copper-manganese alloy containing from 20% to 50% manganese may be used, such, for example, as Coast Metals 1700, which consists of 75% copper and 25% manganese. Such an alloy, although it contains no nickel, would, in the bonding process, dissolve sufficient nickel from the nickel powder to create a copper-manganese-nickel alloy of indefinite composition, but with relatively low nickel content, due to the rapid induction heating employed in the process.

Although a specific shank material has been described, i.e., S.A.E. 3445, the shank material, die, or other support member may be any one of the so-called "die steels," or even some of the more "sophisticated" S.A.E. varieties commonly classed as alloy steels. The heat treatment will vary, dependent on the steel thus used.

It is to be understood that various changes may be made in the method which has been described, without departing from the spirit of the invention or the scope of the appended claims.

Having thus described my invention, I claim:

1. In a method of bonding a carbide element to a support member, the steps which consist in interposing between the element and support member a preformed compact consisting of a mixture of nickel powder and an alloy powder of the group consisting of copper-manganese and copper-manganese-nickel alloys, and then heating the assembly to a temperature below the melting point of the nickel powder to cause said compact to bond said element to said support member.

2. The method, as recited in claim 1, wherein said mixture consists of about 50% nickel powder, and about 50% of said alloy powder.

3. The method, as recited in claim 2, wherein said copper-manganese-nickel alloy powder consists of about 67.5% copper, about 23.5% manganese, and about 9.0% nickel.

4. In a method of bonding a tungsten carbide tip to a shank of S.A.E. 3445 Steel, the steps which comprise interposing between said tip and shank a preformed and sintered compact consisting of a mixture of nickel powder and a copper-manganese-nickel alloy powder, and of a thickness not substantially in excess of $\frac{1}{32}''$, then heating the assembly at a temperature below the melting point of the nickel powder to cause said compact to bond the tip to said shank, and then heat treating to impart a martensitic structure to said shank.

5. A preformed and sintered compact for brazing purposes, said compact comprising an element in a form adapted to be interposed between the parts to be joined, and consisting of a mixture of nickel powder, and a copper-manganese-nickel alloy powder.

6. A preformed and sintered compact, as defined in claim 5, wherein said copper-manganese-nickel alloy powder consists of about 67.5% copper, about 23.5% manganese, and about 9.0% nickel.

References Cited

UNITED STATES PATENTS

| | | | |
|---|---|---|---|
| 2,606,362 | 8/1952 | Martin et al. | 29—498 X |
| 2,741,932 | 4/1956 | Whitney et al. | 74—597 |
| 2,817,144 | 12/1957 | Zeller | 29—501 X |
| 2,856,281 | 10/1958 | Cremer | 29—501 |
| 3,133,347 | 5/1964 | Cape | 29—501 X |
| 3,198,609 | 8/1965 | Cape | 29—501 X |
| 3,271,822 | 9/1966 | Rhino | 29—473.1 X |
| 3,279,049 | 10/1966 | Ellis et al. | 29—502 X |
| 3,296,693 | 1/1967 | Carter | 29—504 X |

FOREIGN PATENTS

| | | |
|---|---|---|
| 698,946 | 12/1964 | Canada. |

JOHN F. CAMPBELL, *Primary Examiner.*

J. L. CLINE, *Assistant Examiner.*

U.S. Cl. X.R.

29—182.1, 501, 504